July 9, 1929. H. D. NORTH 1,720,232
LIGHT REFLECTING SCREEN AND PROCESS FOR MAKING THE SAME
Filed March 19, 1928

INVENTOR
Harold D. North
BY
Evans + McCoy
ATTORNEYS

Patented July 9, 1929.

1,720,232

UNITED STATES PATENT OFFICE.

HAROLD D. NORTH, OF CLEVELAND, OHIO.

LIGHT-REFLECTING SCREEN AND PROCESS FOR MAKING THE SAME.

Application filed March 19, 1928. Serial No. 262,940.

This invention relates to diffusely reflecting surfaces and processes for their manufacture and in particular to the production of screens designed for showing projected pictures.

An object of the invention is the production of a screen for this purpose having superior qualities as regards brilliancy, definition and uniformity of reflection both as regards spot to spot in the screen and point to point from which the picture is viewed.

A further object is a screen which will reflect accurately whatever color or mixture of color is projected upon it.

Another object is to produce a light reflecting surface in which the reflected light is substantially constant with respect to the light of incidence, whatever the intensity of the latter.

A further object is a screen which will reflect in proper manner a larger proportion of the light projected upon it than do other screens used to show projected pictures.

The most brilliant screens hitherto in use have been those screens employing as a reflecting surface metallic powders, particularly aluminum powder. Those screens, however the powder has been applied, tend to give more or less specular reflection, such as that shown by the ordinary mirror. If one attempted to project on a mirror the observer would only see the image of the source of light. If, however, the mirror is dimmed the image of the light source broadens out and we commence to see the picture it is desired to project. The reflected light instead of being reflected along one angular direction only is reflected along a family of angles. The optimum would be perfectly diffuse reflection, that is, where a single pencil of light is reflected in all directions and where the intensity of light flux of the reflected light coming from the point of reflection at a given angle is equal to that at any other angle. This has, however, never actually been achieved in practice.

An approach to such a type of reflection is obtained in the glass bead screen in which very small spherical glass beads are uniformly and closely applied to a plane surface. But the glass being transparent, part of the incident light is transmitted through the surface, except where the angle of total reflection is exceeded, and this light is absorbed, suffers internal reflection and reappears changed in color, diminished in amount and at a different point from which it struck the screen. This latter fact injures the definition with which a projected picture is seen. Moreover, this objection is most in evidence with light striking the screen normally and tends to dull the projected picture most at just the angle at which it is most desirable to view it.

According to my invention I am able to provide a light reflecting surface composed of microscopic spheroidal or spherical bodies with metallic reflecting surfaces. The bodies, while microscopic, vary greatly in size and thus furnish a mass in which the bodies are closer together and much finer than is possible in the application of macroscopic spherical bodies, such as glass beads, to a suitable support.

The process herein outlined gives a surface practically entirely composed of particles of microscopic size but of substantially spherical or spheroidal reflecting surfaces, particularly with respect to their outer aspect. Their surface is of a metallic nature and, of course, possesses metallic lustre, and it will be seen that from such a surface structure, a substantially perfect diffuse reflection would theoretically be expected to take place. This in fact is the case in a screen made according to my process.

Figure 4:
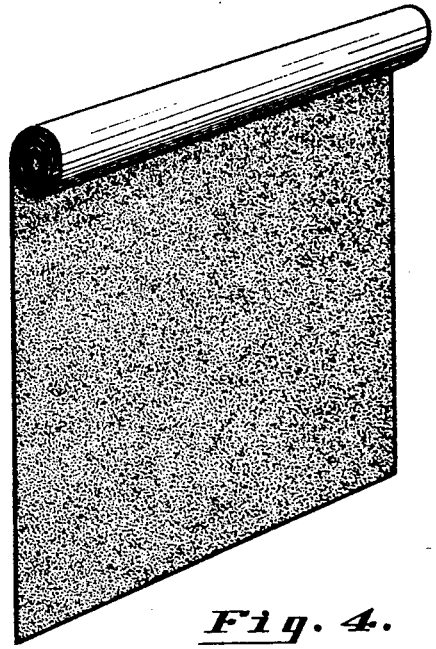
Fig. 4 is a perspective view of such a surface deposited on a flexible background.

The reflecting surface may be applied to a suitable rigid support such for example, as a sheet of aluminum or a flexible support as indicated in Fig. 4 and it may be applied in various ways providing that certain principles of application are kept in mind.

As an illustrative method the following may be taken.

A fine grade of flake aluminum powder is taken and mixed with a small quantity of a suitable body such as amyl acetate and a large amount of a suitable volatile thinner therefor. The mixture while agitated is atomized in any suitable manner, and applied to the surface it is desired to coat. The way this is done is immaterial provided that at no time the atomized particles of fluid bearing the flaked aluminum be allowed to coalesce. In practice this may be conveniently done by applying the surface in many coats, each so thin that the constituent particles are and remain separate.

Figure 3:
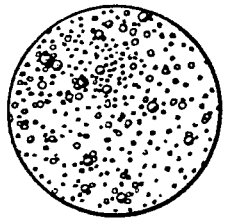
Fig. 3 is a similar copy of a photo-micrograph of a screen in an earlier stage of manufacture.

The first coat for example, when applied will appear as a barely perceptible clouding of the surface and if examined with a microscope this clouding will be seen to consist of microscopic nearly spherical particles somewhat as shown in Fig. 3, irregularly laid on and adherent to the surface of the support but in general not contiguous to one another. No further coat is added until the thinner has volatilized and these particles become solid in form.

As further coats are added these particles become located closer and closer to one another until a continuous agglomerated mass of them is secured but the coats are not applied in such a manner that adjacent particles can coalesce.

Figure 1:
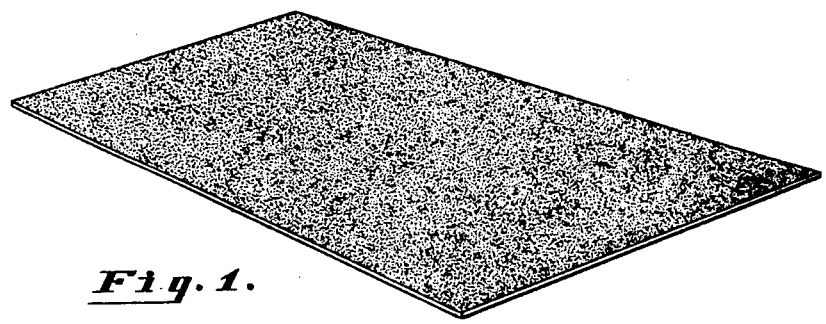
Figure 1 shows in perspective a screen such as is herein described.
Figure 2:
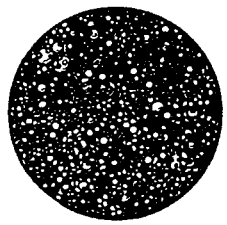
Fig. 2 is a copy made somewhat diagrammatic of a photo-micrograph of a portion of such a surface illuminated by light incident at 60 degrees and magnified 48 diameters.

Referring to Fig. 2 showing such a surface largely magnified, it will be seen that the particles of the suspension of aluminum flakes tend to preserve their discrete character although adherent to one another and also as regards their outer or reflecting aspect to preserve their original spherical or spheroidal contour, the surface of each particle consisting of a number of very small aluminum flakes so disposed as to be substantially tangent to the spheroidal surface.

It is believed that the peculiar surface attained may be explained as follows. The flake aluminum used is such that it will "leaf", that is, particles of aluminum suspended in the liquid vehicle tend to go into the surface separating that vehicle from air, whether the surface be that of a drop or a pool of the vehicle. The phenomenon of "leafing" is connected with the phenomenon of surface tension and is such that the migration of a solid particle into the surface between two fluids causes a diminution in total surface energy. Taking the present case for example, the aluminum particles possess a surface tension with respect to air and with respect to the vehicle and the vehicle a surface tension with respect to air. When a flake of aluminum comes into the surface, a certain area of air-vehicle surface and vehicle-air surface is replaced by air-aluminum surface. If the surface tension of the air-aluminum surface is less than that of the sum of the other two surface tensions involved, a particle coming into the surface will stay there. In this connection the aluminum surface is considered to be the surface of any substance so firmly attached to the aluminum as to be inseparable from it by the solvent action of the vehicle. This is a well known phenomenon in colloid chemistry and has, in fact, been used to form stable emulsions. Certain dyes, for example, which do not really go into solution but form suspensions in which the particles are of ultra microscopic size will pass into the interface of emulsions and by their physical presence tend to prevent coalescence of the droplets of the disperse phase. Now in the process under consideration we have a colloid system consisting of the vehicle with its suspended flakes as the disperse phase and the air as the continuous. The flakes will tend to migrate into the spherical droplet surfaces and prevent such droplets from coalescing. On evaporation of the thinner and hardening of the body this structure becomes fixed.

The process above outlined, while illustrative, is not by any means the only way in which a surface, essentially similar as regards light reflection, may be constructed. Such a surface may be made and falls within the scope of this invention, by any method in which fine spheroidal particles of metallic lustre and considerable size distribution may be made and applied to a supporting surface, whether plane or curved. I may, for example, spray such a supporting surface with minute molten droplets of a metal such as silver, tin, or aluminum or chromium, which possesses high reflective power and/or resistance against tarnishing. Or such a metal may be powdered in any suitable way in which the particles are made minute and relatively spherical. Such a powder may be polished, if necessary, by tumbling either in the wet or dry state and the polished powder applied to an adhesive background.

It will thus be seen that I have provided a light reflecting surface which has superior properties as regards its ability to reflect light in all directions, its power to reflect such light truly from the point at which it struck the surface, and its power to reflect such light truly both as regards color and intensity, thus making such a surface a very superior one on which to project a picture.

Such a surface has many uses other than the use herein outlined. Providing as it does an inexpensive diffusely reflecting surface of great efficiency it may be used to cover wall surfaces where diffuse lighting is important, such as laboratories, drafing rooms and the like. It is also advantageous for reflectors used in indirect lighting, for photographic illuminators on reflecting screens, and for many other purposes.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. A light reflecting surface comprising a surface built up into a firmly adhering mass of agglomerated microscopic spheroidal particles of considerable range in size, said particles having a spheroidal metallic reflecting surface, the spheroidal surface of the particles being substantially preserved on their outer aspect.

2. A screen for displaying projected pictures comprising a surface made up of agglomerated microscopic spheroidal particles of considerable range in size with substantially metallic reflecting surfaces, the spheroidal surface of the particles being substantially preserved on their outer aspect and forming a macroscopically substantially plane surface composed of such particles built up into a firmly adhering mass.

3. An article of the class described, comprising a support having a smooth face, said support carrying on said face a deposit of agglomerated microscopic spheroidal particles of considerable range in size with substantially metallic reflecting surfaces, the spheroidal surfaces of the particles being substantially preserved on their outer aspect and the deposit forming a macroscopically substantially plane surface composed of a firmly adhering mass of such particles.

4. A screen for displaying projected pictures comprising an aluminum support having a relatively smooth face, said support carrying on said face a deposit of agglomerated microscopic spheroidal particles of considerable range in size with substantially metallic reflecting surfaces, the spheroidal surfaces of the particles being substantially preserved on their outer aspect and the deposit forming a macroscopically substantially plane surface composed of a firmly adhering mass of such particles.

5. The process of forming a diffusely reflecting surface for light which consists in suspending aluminum particles in a liquid vehicle, largely composed of highly volatile thinner, atomizing such suspension, and spraying it on a supporting surface to form a firmly adhering mass and preventing coalescence of the droplets.

6. The process of forming a diffusely reflecting surface for light which consists in suspending metallic particles, having the property of leafing, in a vehicle largely composed of highly volatile thinner, atomizing the suspension to form droplets, coating a supporting surface with such droplets, to form a firmly adhering mass and preventing the coalescence of the droplets.

7. The process of forming a diffusely reflecting surface for light which consists in forming a suspension of metallic particles having the property of leafing, in a vehicle suitably thinned with a highly volatile thinner, atomizing the suspension to form droplets, and applying such droplets to a supporting surface in several operations and permitting the surface to dry between each operation to such an extent that coalescence of the droplets lying adjacent to one another is largely prevented.

8. The process of forming a diffusely reflecting surface for light which consists in forming a suspension of aluminum particles, having the property of leafing, in a vehicle suitably thinned with a highly volatile thinner, atomizing the suspension to form droplets and applying such droplets to a supporting surface in several operations and permitting the surface to dry between each operation to such an extent that coalescence of the droplets lying adjacent to one another is largely prevented.

9. The process of forming a diffusely reflecting surface for light which consists in forming a suspension of aluminum particles, having the property of leafing, in a liquid vehicle, atomizing the suspension to form droplets and applying such droplets to a supporting surface in several operations and permitting the surface to dry between each operation to such an extent that coalescence of the droplets lying adjacent to one another is largely prevented.

10. The process of forming a diffusely reflecting surface for light which includes applying spheroidal particles having a bright metallic reflecting surface to a support, causing said particles to firmly adhere to the surface of the support to form an adhering mass, and substantially preserving the spheroidal form on the outer aspect of the individual particles.

11. A screen for displaying projected pictures comprising a support having a coating thereon forming a reflecting surface, said coating consisting of a continuous mass of material having a metallic lustre and firmly adhering to said support, the reflecting surface of said coating being composed of protruding convex reflecting elements of microscopic size and substantially spheroidal contour.

In testimony whereof I affix my signature.

HAROLD D. NORTH.